(12) United States Patent
Schoellkopf

(10) Patent No.: US 6,378,108 B1
(45) Date of Patent: Apr. 23, 2002

(54) PARITY CHECKING CIRCUIT

(75) Inventor: Jean-Pierre Schoellkopf, Grenoble (FR)

(73) Assignee: STMicroelectronics S.A., Gentilly (FR)

( * ) Notice: Subject to any disclaimer, the term of this patent is extended or adjusted under 35 U.S.C. 154(b) by 0 days.

(21) Appl. No.: 09/238,406

(22) Filed: Jan. 26, 1999

(30) Foreign Application Priority Data

Jan. 27, 1998 (FR) ............................................. 98 01102

(51) Int. Cl.[7] ........................ H03M 13/00; G01R 31/28
(52) U.S. Cl. ....................................... 714/800; 714/726
(58) Field of Search ................................ 714/726, 729, 714/727, 30, 800, 801, 728, 731

(56) References Cited

U.S. PATENT DOCUMENTS

| | | | | |
|---|---|---|---|---|
| 4,926,424 A | * | 5/1990 | Maeno | 714/719 |
| 5,267,249 A | * | 11/1993 | Dong | 714/775 |
| 5,574,733 A | * | 11/1996 | Kim | 714/728 |
| 6,199,182 B1 | * | 3/2001 | Whetsel | 714/724 |

OTHER PUBLICATIONS

European Patent Abstract of Japanese Publication No. 03099522, published Apr. 24, 1991.

French Search Report dated Sep. 30, 1998 with annex on French Application No. 98–01102.

"Parity Generator Integrated With Latches", IBM Technical Disclosure Bulletin, vol. 29, No. 8, Jan. 8, 1987, pp. 3342–3344, Armonk, New York, USA.

* cited by examiner

*Primary Examiner*—Christine T. Tu
(74) *Attorney, Agent, or Firm*—Lisa K. Jorgenson; Stephen Bongini; Fleit, Kain, Gibbons, Gutman & Bongini P.L.

(57) ABSTRACT

A circuit for checking the parity of the contents of a register is provided. The register has a test mode in which a scan input of each flip-flop in the register is connected to a scan output of a preceding flip-flop to form a scan path. The parity checking circuit includes an XOR gate for at least each flip-flop from the second flip-flop to the last flip-flop of the register. Each XOR gate has one input connected to the normal output of the associated flip-flop, another input connected to the scan input for the flip-flop, and an output connected to the scan output of the flip-flop when not in the test mode. The result of the parity checking operation is generated at the output of the XOR gate associated with the last flip-flop of the register. In preferred embodiments, for each flip-flop of the register, the normal output of the flip-flop is supplied to the scan output in the test mode, and the output of the associated XOR gate is supplied to the scan output when not in the test mode.

25 Claims, 2 Drawing Sheets

PARITY CHECKING CIRCUIT

CROSS-REFERENCE TO RELATED APPLICATIONS

This application is based upon and claims priority from prior French Patent Application No. 98-01102, filed Jan. 27, 1998, the entire disclosure of which is herein incorporated by reference.

BACKGROUND OF THE INVENTION

1. Field of the Invention

The present invention relates to digital systems, and more specifically to circuits for checking the parity of the contents of a register.

2. Description of Related Art

In a typical conventional digital system, data that is exchanged is provided with a parity bit. The parity bits are generated by a data transmitting circuit such that the number of "1" level bits of each datum, including the parity bit, is even. A data receiving circuit checks the number of "1" bits in each received datum to determine if the datum was corrupted during transmission. Typically, such parity checking is performed at the level of the registers that temporarily store the received data.

FIG. 1 shows a conventional structure for a register and an associated parity checking circuit. The register includes flip-flops 10 that each receive one bit D0 to Dn of a datum (including the parity bit) at the D input. All of the flip-flops 10 receive a common clock signal CK, and the Q outputs Q0 to Qn of the flip-flops 10 are supplied to another circuit (not shown) that utilizes or transmits the datum stored in the register. Additionally, a parity checking circuit 12, which is typically an exclusive-or (XOR) gate with the necessary number of inputs, receives all of the Q outputs of the flip-flops 10. The parity checking circuit generates an error signal ERR whenever the parity is incorrect (i.e., when there is not an even number of "1" bits in the registers).

Although the conventional structure of FIG. 1 allows parity checking to be performed by the data receiving circuit, the interconnections between the flip-flops and the parity checking circuit occupy a significant metallization surface area. Further, such interconnections significantly increase the capacitances at the outputs of the flip-flops.

SUMMARY OF THE INVENTION

In view of these drawbacks, it is an object of the present invention to remove the above-mentioned drawbacks and to provide a parity checking circuit that allows the metallization surface area occupied by the interconnections between the parity checking circuit and an associated register to be reduced. The associated register has a test mode in which the flip-flops of the register are serially-connected to form a scan path (i.e., a scan input of each flip-flop is connected to a scan output of the preceding flip-flop). The parity checking circuit includes an XOR gate for at least each flip-flop from the second flip-flop to the last flip-flop of the register. Each XOR gate has one input coupled to the normal output of the associated flip-flop, another input coupled to the scan input of the flip-flop, and an output coupled to the scan output of the flip-flop whenever the register is not in the test mode. The result of the parity checking operation is generated at the output of the XOR gate associated with the last flip-flop of the register. In preferred embodiments, for each flip-flop of the register, the normal output of the flip-flop is supplied to the scan output in the test mode, and the output of the associated XOR gate is supplied to the scan output when not in the test mode.

One embodiment of the present invention provides a register that is formed by a first cell and other cells. Each of the other cells in the register include a scan input, a scan output, a flip-flop, and an XOR gate. The scan input is coupled to the input of the flip-flop and the output of the flip-flop is coupled to the scan output when the register is in a test mode. Further, the output of the flip-flop is coupled to a first input of the XOR gate and the scan input is coupled to a second input of the XOR gate. The output of the XOR gate is coupled to the scan output when the register is not in the test mode. In a preferred embodiment, the XOR gates of the other cells perform a parity checking operation on the register and a result of the parity checking operation is provided at the scan output of the other cell at the end of the scan path.

Other objects, features, and advantages of the present invention will become apparent from the following detailed description. It should be understood, however, that the detailed description and specific examples, while indicating preferred embodiments of the present invention, are given by way of illustration only and various modifications may naturally be performed without deviating from the present invention.

DETAILED DESCRIPTION OF PREFERRED EMBODIMENTS

Preferred embodiments of the present invention will be described in detail hereinbelow with reference to the attached drawing.

Figure 2:
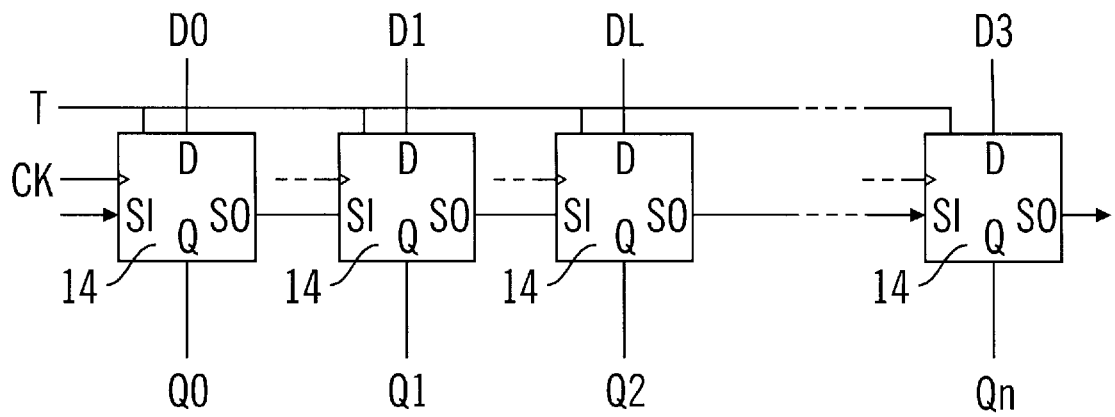
FIG. 2 is a block diagram showing a register having a test mode in which a scan path is formed.

FIG. 2 shows a register having a test mode in which the flip-flops of the register are interconnected to form a scan path. According to the present invention, such a register is used in implementing a parity checking circuit with a reduced interconnection surface area. As shown, the register is formed by flip-flop cells 14 that each have a data input D, a clock input CK, an output Q, a scan input SI, a scan output SO, and a mode setting input T. All of the mode setting inputs receive a common mode signal T, and the scan input SI of each cell is connected to the scan output SO of the preceding cell, which can be a cell in the same register or some other cell. When the mode signal T is set to place the register in the test mode, a serial chain connecting all of the flip-flops is formed. Because the cell interconnections for providing the test mode are known, a further explanation is omitted.

Figure 1:
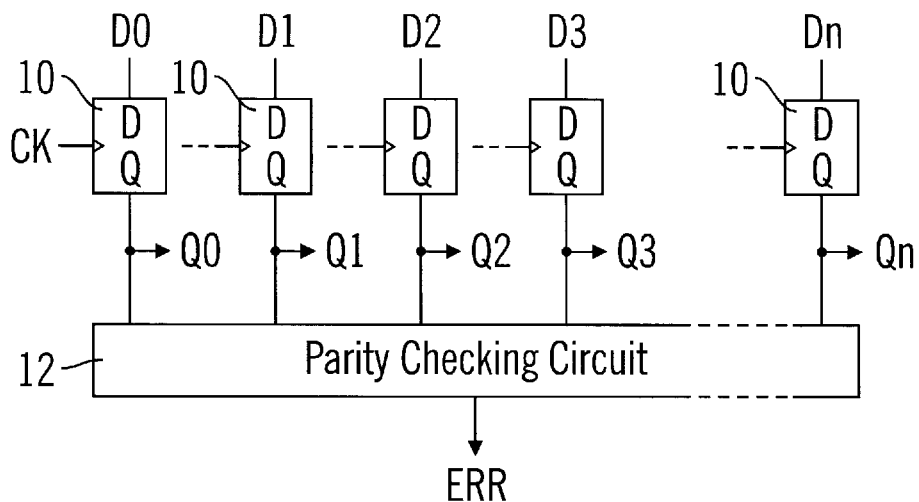
FIG. 1 is a block diagram showing a conventional structure for a parity checking circuit and the flip-flops of a register.
Figure 3:
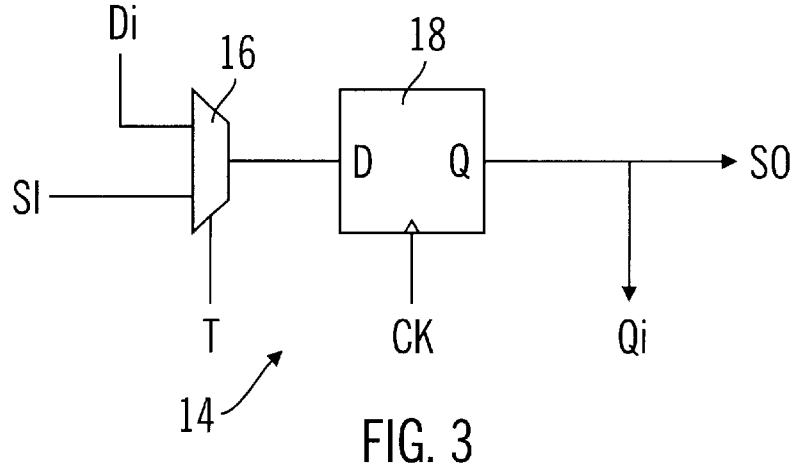
FIG. 3 is a block diagram showing in more detail one of the flip-flop cells of FIG. 2.

FIG. 3 shows the structure of a cell 14 of the type used in FIG. 2. The data input Di receives the data bit to be stored in the cell and a flip-flop 18 provides for storage. A first input of a multiplexer 16 receives the data input Di for the cell, and a second input of the multiplexer 16 receives the scan input SI for the cell. The multiplexer 16 is controlled by the mode signal T such that in test mode the scan input SI is supplied to the input D of the flip-flop 18, and in normal mode the data input Di is supplied to the input D of the flip-flop 18. Typically, the scan output SO and the normal data output Qi of the cell are identical, and each of these outputs is provided from the output of the flip-flop 18 by a buffer amplifier. When such a cell is used to form a register of the type shown in FIG. 2, the flip-flops 18 are coupled together in the manner shown in FIG. 1 when the mode signal T is inactive (e.g., "0"). Conversely, when the test signal is active (e.g., "1"), the flip-flops 18 are coupled so as to form a shift register with other flip-flops in the circuit.

Figure 4:
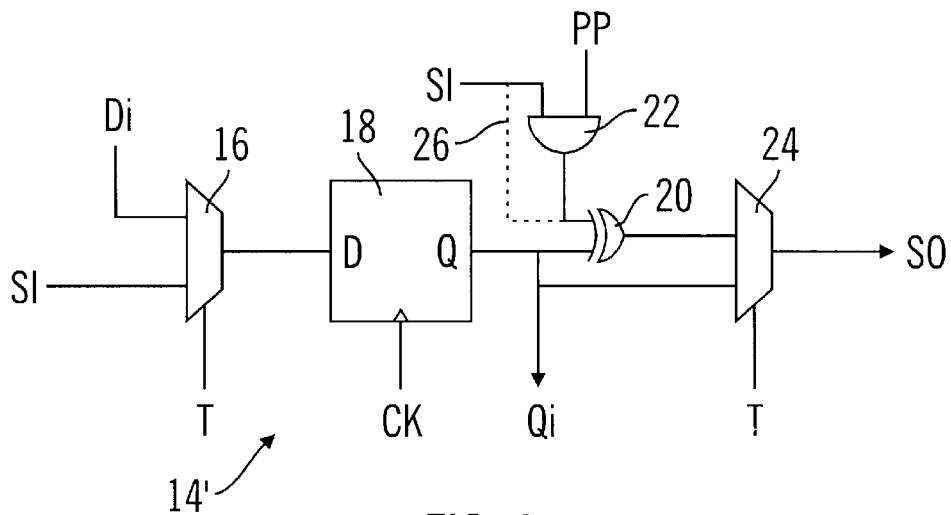
FIG. 4 is a block diagram showing a flip-flop cell for use in implementing a parity checking circuit according to an embodiment of the present invention.

In accordance with the present invention, part of the function of a parity checking circuit is implemented in each cell of a register and these parts cooperate through the links between the scan inputs and scan outputs of all of the cells to provide parity checking. An embodiment of a flip-flop cell that includes part of the function of a parity checking circuit is shown in FIG. 4. The flip-flop cell 14' includes a multiplexer 16 and a flip-flop 18 configured in the same manner as in the flip-flop cell 14 of FIG. 3. Additionally, the cell 14' includes an XOR gate 20 that receives the output Q of the flip-flop 18 on a first input and the scan input SI of the cell on a second input.

The scan output SO is provided by a second multiplexer 24 that receives the output Q of the flip-flop 18 on a first input and the output of the XOR gate 20 on a second input. The second multiplexer 24 is controlled by the mode signal T so as to supply the output of the flip-flop in test mode and the output of the XOR gate when not in the test mode. In a preferred embodiment, the flip-flop cells of different registers are connected in the scanning chain of the test mode. In such embodiments it is necessary to be able to differentiate each register, so the scan input is supplied to an AND gate 22 along with a parity propagation signal PP, and the output of the AND gate 22 is supplied to the second input of the XOR gate 20.

Figure 5:
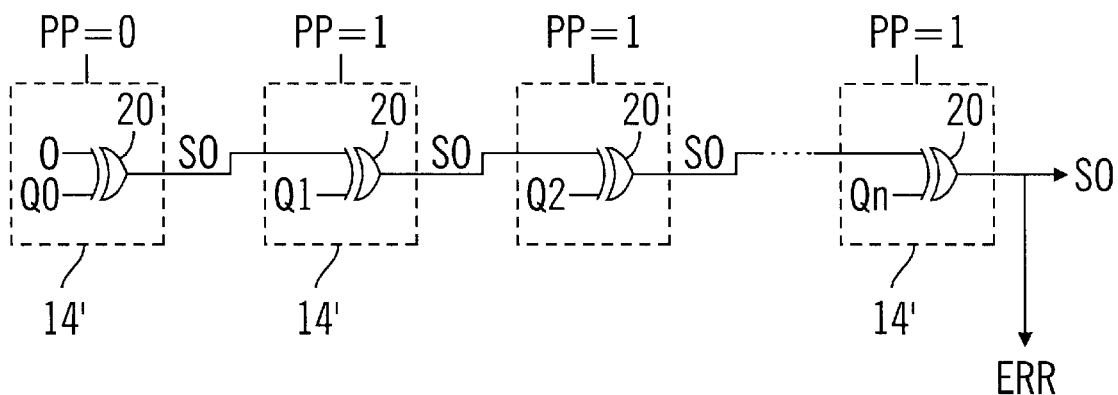
FIG. 5 is a block diagram showing the elements of the parity checking circuit when a plurality of the flip-flop cells of FIG. 4 are connected to form a register.

The parity checking operation in a register formed with the flip-flop cell of FIG. 4 will now be explained with reference to FIG. 5. In particular, FIG. 5 shows the non-test mode interconnection of the XOR gates when a plurality of the flip-flop cells of FIG. 4 are connected to form a register of the type shown in FIG. 2. As shown, the parity propagation signal PP of the first cell in the register is set to "0", and the parity propagation signals PP of all other cells in the same register are set to "1". For each cell 14' receiving a parity propagation signal PP of "1", the XOR gate 20 of the cell receives the output Qi of the flip-flop 18 of the cell and the output of the XOR gate 20 of the preceding cell. Further, the XOR gate 20 of the first cell of the register always receives "0" at its second input instead of a value that is dependent on a preceding cell, so the output of the flip-flop of the first cell is passed through to the scan output of the first cell. In other words, the XOR gate 20 of the second cell of the register receives the outputs Q0 and Q1 of the flip-flops of the first and second cells of the register.

When the two-input XOR gates of the cells are interconnected in the manner shown in FIG. 5, the function of a multiple input XOR gate is provided with the parity error signal ERR being provided at the output of the XOR gate of the last cell of the register. Furthermore, the registers of the circuit are definitively defined when the circuit is designed, so it is not necessary to provide parity propagation signals PP to differentiate the registers. Instead, a further embodiment is provided in which the first cell of each register is of the type shown in FIG. 3 (i.e., no XOR gate is provided) and the other cells of the registers are of the type shown in FIG. 4 except that the scan input SI is directly connected to the second input of the XOR gate 20, as shown by the dotted line 26 in FIG. 4.

While there has been illustrated and described what are presently considered to be the preferred embodiments of the present invention, it will be understood by those skilled in the art that various other modifications may be made, and equivalents may be substituted, without departing from the true scope of the invention. Additionally, many modifications may be made to adapt a particular situation to the teachings of the present invention without departing from the central inventive concept described herein. Furthermore, embodiments of the present invention may not include all of the features described above. Therefore, it is intended that the present invention not be limited to the particular embodiments disclosed, but that the invention include all embodiments falling within the scope of the appended claims.

What is claimed is:

1. A register formed by a first cell and a plurality of other cells, the register having a test mode in which a scan input of each of the other cells is connected to a scan output of another of the other cells or the first cell so as to form a scan path, each of the other cells comprising:
   a scan input;
   a scan output;
   a flip-flop having an input and an output, the scan input being coupled to the input of the flip-flop and the output of the flip-flop being coupled to the scan output when the register is in a test mode; and
   an XOR gate, the output of the flip-flop being coupled to a first input of the XOR gate, and the scan input being coupled to a second input of the XOR gate,
   wherein an output of the XOR gate is coupled to the scan output when the register is not in the test mode, and the output of the XOR gate is uncoupled from the scan output when the register is in the test mode.

2. The register as defined in claim 1, wherein each of the other cells further comprises a first multiplexer for coupling the output of the flip-flop to the scan output when the register is in the test mode, and for coupling the output of the XOR gate to the scan output when not in the test mode.

3. The register as defined in claim 2, wherein each of the other cells further comprises:
   a data input; and
   a second multiplexer for coupling the scan input to the input of the flip-flop when the register is in the test mode, and for coupling the data input to the input of the flip-flop when the register is not in the test mode.

4. The register as defined in claim 2, wherein in each of the other cells, the scan input is directly connected to the second input of the XOR gate.

5. The register as defined in claim 2, wherein each of the other cells further comprises an AND gate, the scan input being connected to a first input of the AND gate, a control signal being connected to a second input of the AND gate, and an output of the AND gate being connected to the second input of the XOR gate.

6. The register as defined in claim 1, wherein the XOR gates of the other cells perform a parity checking operation on the register when the register is not in the test mode and a result of the parity checking operation is provided at the scan output of the other cell at a terminal end of the scan path.

7. The register as defined in claim 1, wherein the first cell includes a scan input, and when the register is in the test mode, the scan input of the first cell is coupled to the scan output of a cell in another register so as to form a continuous scan path between the register and the other register.

8. A circuit comprising:

a first flip-flop having a scan output;

a plurality of other flip-flops each having a scan input and a scan output, the first flip-flop and the other flip-flops forming a register, the register having a test mode in which the scan input of each of the other flip-flops is connected to the scan output of another of the other flip-flops or the first flip-flop so as to form a scan path; and a plurality of XOR gates, one of the XOR gates being provided for each of the other flip-flops, each of the XOR gates including:

a first input coupled to a normal output of the corresponding other flip-flop;

a second input coupled to the scan input of the corresponding other flip-flop; and an output coupled to the scan output of the corresponding other flip-flop when the register is not in the test mode and uncoupled from the scan output of the corresponding other flip-flop when the register is in the test mode.

9. The circuit as defined in claim 8, further comprising:

a plurality of first multiplexers, one of the first multiplexers being provided for each of the other flip-flops, wherein each first multiplexer couples a normal output of the corresponding other flip-flop to the scan output of the corresponding other flip-flop when in the test mode, and couples the output of the corresponding XOR gate to the scan output of the corresponding other flip-flop when not in the test mode.

10. The circuit as defined in claim 9, further comprising:

a plurality of second multiplexers, one of the second multiplexers being provided for each of the other flip-flops, wherein each second multiplexer couples the scan input of the corresponding other flip-flop to the corresponding other flip-flop when in the test mode, and couples a data input to the corresponding other flip-flop when not in the test mode.

11. The circuit as defined in claim 9, wherein the second input of each XOR gate is directly connected to the scan input of the corresponding other flip-flop.

12. The circuit as defined in claim 9, further comprising:

a plurality of AND gates, one of the AND gates being provided for each of the XOR gates, wherein each AND gate includes a first input for receiving the scan input of the corresponding other flip-flop, a second input for receiving a control signal, and an output that is connected to the second input of the corresponding XOR gate.

13. The circuit as defined in claim 8, wherein the XOR gates perform a parity checking operation on the register when the register is not in the test mode and a result of the parity checking operation is available at the output of the XOR gate for the other flip-flop at a terminal end of the scan path.

14. The circuit as defined in claim 8, wherein the first flip-flop has a scan input, and when the register is in the test mode, the scan input of the first flip-flop is coupled to the scan output of a flip-flip in another register so as to form a continuous scan path between the register and the other register.

15. A circuit comprising:

a scan input;

a scan output;

a first flip-flop, the scan input being coupled to an input of the first flip-flop;

a first XOR gate, an output of the first flip-flop being coupled to a first input of the first XOR gate, and the scan input being coupled to a second input of the first XOR gate;

a second flip-flop, an output of the first XOR gate being coupled to an input of the second flip-flop; and a second XOR gate, an output of the second flip-flop being coupled to a first input of the second XOR gate, and the output of the first XOR gate being coupled to a second input of the second XOR gate, wherein an output of the second XOR gate is coupled to the scan output.

16. The circuit as defined in claim 15, further comprising:

a first multiplexer having a first input connected to the output of the first flip-flop, a second input connected to the output of the first XOR gate, and an output coupled to the input of the second flip-flop; and a second multiplexer having a first input connected to the output of the second flip-flop, a second input connected to the output of the second XOR gate, and an output coupled to the scan output.

17. The circuit as defined in claim 16, further comprising:

a first data input;

a second data input;

a third multiplexer having a first input connected to the scan input, a second input connected to the first data input, and an output coupled to the input of the first flip-flop; and a fourth multiplexer having a first input connected to the output of the first multiplexer, a second input connected to the second data input, and an output coupled to the input of the second flip-flop.

18. The circuit as defined in claim 17, further comprising a third flip-flop having an output connected to the scan input.

19. The circuit as defined in claim 18, further comprising:

a third data input; and a fifth multiplexer having an input connected to the third data input and an output connected to an input of the third flip-flop.

20. The circuit as defined in claim 16, wherein the scan input is directly connected to the second input of the first XOR gate, and the output of the first multiplexer is directly connected to the second input of the second XOR gate.

21. The circuit as defined in claim 16, further comprising:

a first AND gate having a first input connected to the scan input and an output connected to the second input of the first XOR gate; and a second AND gate having a first input connected to the output of the first multiplexer and an output connected to the second input of the second XOR gate.

22. The circuit as defined in claim 15, further comprising a third flip-flop having an output that is connected to the scan input.

23. The circuit as defined in claim 15, wherein in a first mode of operation, the scan input is supplied to the input of the first flip-flop, the output of the first flip-flop is supplied to the input of the second flip-flop, and the output of the second flip-flop is supplied to the scan output so as to form a scan path.

24. The circuit as defined in claim 23, wherein in a second mode of operation, a first data input is supplied to the input of the first flip-flop, a second data input is supplied to the input of the second flip-flop, the output of the first XOR gate is supplied to the input of the second XOR gate, and the output of the second XOR gate is supplied to the scan output.

25. The circuit as defined in claim 24, wherein when in the second mode of operation, the scan input is coupled to a scan output of another circuit and a parity checking operation is performed with a result of the parity checking operation being provided at the output of the second XOR gate.

* * * * *